3,484,450
SULPHONYLAMINO BENZOTHIAZOLE CONTAINING PHTHALOCYANINE DYESTUFFS
Karl-Heinz Schundehutte, Opladen, Kersten Trautner, Cologne-Stammheim, and Walter Horstmann and Horst Jager, Cologne-Buchheim, Germany, assignors to Farbenfabriken Bayer Aktiengesellschaft, Leverkusen, Germany, a corporation of Germany
No Drawing. Filed Nov. 3, 1966, Ser. No. 591,716
Claims priority, application Germany, Nov. 12, 1965, F 47,662
Int. Cl. C09b 47/04
U.S. Cl. 260—299        10 Claims

ABSTRACT OF THE DISCLOSURE

Dyestuffs for natural or regenerated cellulose fibers are formed by condensing a metal phthalocyanine polysulphonic acid halide in any sequence with an aminobenzothiazole substituted in the 2-position by a sulphonyl group.

---

The present invention relates to valuable reactive dyestuffs of the phthalocyanine series; the new dyestuffs correspond, in the form of the free acid, to the general formula

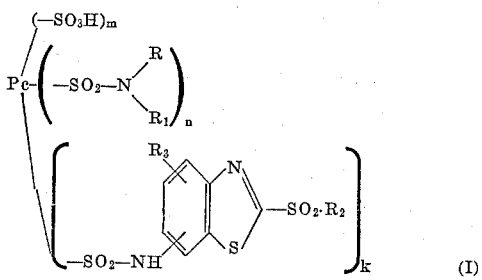

(I)

In this formula Pc is the radical of a copper, nickel- or cobalt-phthalocyanine, R and $R_1$ are hydrogen, aliphatic, aromatic, cycloaliphatic, araliphatic or heterocyclic radicals, $R_2$ stands for an alkyl, aralkyl or aryl radical and $R_3$ for hydrogen or a substituent; $m$ stands for a number from 0.5 to 3, $n$ for a number from 0.5 to 3 and $k$ for a number from 1 to 3.

Among the metal-phthalocyanines, the copper phthalocyanines are of particular interest. Examples of (reactive) sulphonyl substituents —$SO_2 \cdot R_2$ in the 2-position of the benzothiazole ring, include the following: methylsulphonyl, ethyl-sulphonyl or propyl-sulphonyl radicals, aryl-sulphonyl radicals, such as phenyl-sulphonyl, p-toluene-sulphonyl, p-chlorophenyl-sulphonyl radicals, aralkylsulphonyl radicals such as benzyl-sulphonyl- and p-tolu-ylmethyl-sulphonyl radicals, heterosulphonyl radicals, α-haloalkyl radicals such as chloromethyl-sulphonyl, carbalkoxymethyl - sulphonyl and carboxymethyl - sulphonyl.

Methyl-sulphonyl, ethyl-sulphonyl and phenyl-sulphonyl radicals are especially preferred groups.

As substituents $R_3$, the following may be used, inter alia: sulphonic acid, carboxylic acid, lower alkyl (with 1–3 carbon atoms), lower alkoxy (with 1–3 carbon atoms), nitro, halogen, hydroxy, acylamino, arylazo, alkyl- and aryl-sulphonyl radicals.

The dyestuffs may contain further substituents, chiefly in the radicals R, $R_1$ and $R_2$, such as halogen, especially chlorine and/or bromine, hydroxy, nitro, cyano, amino, lower alkyl (with 1–3 carbon atoms), lower alkoxy (with 1–3 carbon atoms), acylamino, sulphonic acid, carboxylic acid, disulphimido or sulphone radicals.

Of the alkyl and alkoxy radicals, lower alkyl and alkoxy radicals with 1–4 carbon atoms, such methyl, ethyl and propyl, are preferred. A preferred group of dyestuffs of the formula I contains the radicals $k$, $m$ and $n$, within the range of the values stated above, in such a proportion that the sum total of $k$, $m$ and $n$ is about 3–4. For the use of the new dyestuffs as reactive dyestuffs, the presence of one 2-sulphonyl-benzothiazole-amidosulphonyl reactive group is generally sufficient (i.e. $k \sim 1$; the proportion of the sulphonic acid groups and sulphonamido groups of a differing kind may then be varied according to the type of the dyestuff desired. When the production of the dyestuffs is started from metal phthalocyanine-tetrasulphohalides, the final dyestuffs contains preferably 0.5–2 sulphonamido groups

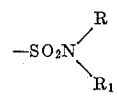

and 0.5–2 free sulphonic acid groups.

When metal phthalocyanine-trisulphohalides are used, the final dyestuff carries, besides the sulphonamido group containing the reactive radical, preferably 0.5–1.5 sulphonamido groups of a different kind and 0.5–1.5 free sulphonic acid groups.

The definition of the radicals R and $R_1$ according to the general Formula I is to be understood in such a way that they exclude the 2-sulphonyl-benzothiazole radical; the

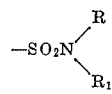

grouping has therefore, in each case a constitution different from the group

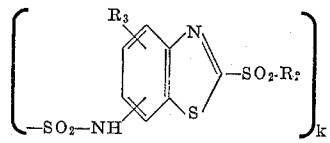

In a preferred group of dyestuffs of the Formula I, the —$SO_2NH$ group stands in the 5- or 6-position, chiefly in the 6-position, of the benzothiazole radical. Furthermore, those derivatives in which $R_3$ stands for hydrogen and $R_2$ for methyl, ethyl, phenyl or mono-substituted derivatives of these radicals, such as chloromethyl, chlorophenyl, methylphenyl, methoxyphenyl and the like, are the easiest to obtain.

The new dyestuffs of the Formula I are obtained by condensing a copper, nickel or cobalt phthalocyanine-poly-sulphonic acid halide, such as di-, tri- or tetrasulphonic acid halide, in any sequence with an aminobenzothiazole substituted in the 2-position by an alkyl-sulphonyl, aralkyl-sulphonyl or aryl-sulphonyl group of the formula

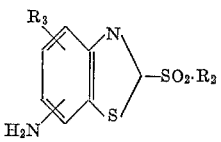

(II)

in which $R_2$ and $R_3$ have the same meaning as above, and with ammonia or a (non-reactive) aliphatic, araliphatic, aromatic, heterocyclic or cycloaliphatic amine and by hydrolysing any remaining acid halide groups. The acid chloride groups are preferably used as sulphonic acid halide groups. These stand preferably in the 3- and/or 4-position of the phthalocyanine; the sulphochlorides are obtained, for example, by direct sulphonation and sulphochlorination of the corresponding phthalocyanines by known methods, for example, according to the process of U.S. patent specification No. 2,219,330.

The process according to the invention may be carried out in the following manner: the phthalocyanine-polysulphonic acid halide used frequently contains, originating from its production, certain quantities of mineral acids, which are buffered in the aqueous suspension of the sulphonic acid halide to a pH value of about 4 by means of alkalies, such as sodium hydroxide solution. There is added to such an aqueous suspension an aminobenzothiazole of the Formula II in a sufficient quantity that the value $k$ in the desired final dyestuff amounts to approximately 1–2. The condensation can be carried out in the absence or in the presence of catalysts; suitable catalysts are, for example, tertiary amines. Among these, pyridine in $\frac{1}{10}$ to equimolar amounts, referred to phthalocyanine-polysulphohalide, is preferably used. The necessary reaction steps up to this stage are expediently carried out at temperatures of 0–5° C. The temperature is then increased, in the course of some hours, to preferably about 25° C. and ammonia or an amine of the specified kind is added in such an amount that the pH value lies between 4 and 8, preferably between 6±0.5. The additional amine component or the ammonia preferably to be used reacts, on the one hand, (besides the aminobenzothiazole of the Formula II) with the phthalocyanine acid halide with the formation of —$SO_2$—$NRR_1$ groups and neutralises, on the other hand, the hydrogen halide liberated in the reaction. This neutralisation can be further promoted, depending on the basic strength of the amine used, by the simultaneous addition of an inorganic alkali, such as sodium carbonate.

In order to shift the relation of the numbers $m$, $n$ and $k$ within the defined range, part of the phthalocyanine-polysulphohalide can be first reacted with the reactive component of the Formula II, optionally with the simultaneous addition of alkalies such as sodium carbonate or sodium hydroxide, followed by condensation with ammonia or an amine. This sequence can also be reversed by first reacting ammonia (or an amine) and simultaneously the reactive component (II) with the phthalocyanine acid halide, then interrupting the addition of ammonia or (non-reactive) amine and continuing the condensation with the reactive component of the Formula II by means of an alkali and the hydrolysis of sulphonic acid halide groups to give sulphonic acid groups.

Already during the condensation of the phthalocyanine-sulphonic acid halide with the amino group-containing reactive component of the Formula II and ammonia or non-reactive amine, a small part of the acid halide groups is hydrolysed to sulphonic acid groups. To achieve the minimum value of 0.5 $SO_3H$ groups in the final dyestuff, it is, therefore, not necessary in each case to hydrolyse finally unreacted sulphonic acid halide groups.

Monoamines are preferably used as (non-reactive) amines. Examples of these amines include: ethylamine, diethylamine, methylamine, dimethylamine, cyclohexylamine, 2-hydroxyethylamine, morpholine, isopropylamine, n-butylamine, isobutylamine, sec.butylamine, bis-(2-hydroxyethyl)amine, bis-(2-cyanoethyl)amine, o-sulphanilic acid, metanilic acid, p-sulphanilic acid, aniline, benzylamine, N-methylaniline, pyrrolidine, N-alkylanilines, chloroanilines, sulphonanilines, naphthylamine, naphthylamine sulphonic acids, morpholine and 3-aminotriazole-(1,2,4).

When the reaction is completed, the dyestuff is precipitated by salting out, e.g. with sodium chloride, and filtered off with suction. In order to improve the quality, the dyestuff may be heated to 50–100° C., preferably to 70–80° C., before it is filtered off with suction, and stirred until cold. Especially pure dyestuffs are obtained by redissolving and clarifying them. The isolated dyestuffs are dried, e.g. at 40–60° C.

The new dyestuffs are valuable reactive dyestuffs which can be fixed on natural or regenerated cotton fibres by the customary dyeing methods, by padding, followed by steaming and thermo-fixing, or they may be fixed from a long dye bath, or applied to these materials by the processes of calico printing. Dyeings and prints with excellent fastness properties, especially fastness to wet processing and light, are obtained. In the calico printing process, dyeings on cotton and staple fibre fabrics have an equal depth of colour and the reactive dyestuffs a good resistance to repeated washing.

The following examples are given for the purpose of illustrating the present invention.

EXAMPLE 1

57.6 grams copper phthalocyanine are introduced at 20–30° C. into 310 ml. chlorosulphonic acid. The temperature is raised to 142° C. in the course of 1½ hours, the reaction mixture kept at this temperature for 3 hours and then cooled to 80° C. At this temperature 50 ml. thionyl chloride are added dropwise with ½ hour, followed by stirring for 3 hours at 90° C. The mixture is cooled to room temperature and poured on to ice in such a way that the temperature does not exceed 5° C. The resultant copper phthalocyanine-tetrasulphonic acid chloride is filtered off with suction, washed with 1 litre 1% hydrochloric acid at 0° C. and suspended in 200 g. ice and 160 ml. ice water.

24 grams 2-methylsulphonyl-6-amino-benzothiazole are then added together with a wetting agent, the reaction mixture is adjusted to pH 4 by means of a concentrated sodium hydroxide solution, whereby the temperature should not exceed 5° C. After the addition of 5 ml. pyridine, the temperature of the mixture is allowed to rise to room temperature within some hours and the eliminated hydrochloric acid is continuously neutralised at a pH of 6±0.5 with a 25% ammonia solution. When the reaction is completed, the mixture is briefly heated at 75° C., stirred until cold and filtered off with suction. The dyestuff obtained is dried at 60° C. under a vacuum. In the form of the free acid, it corresponds to the probable formula

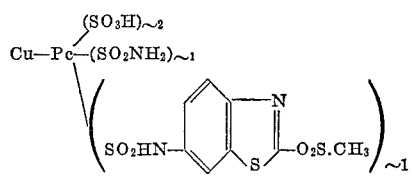

A cellulose fabric is printed with a printing paste which contains, per kg., 30 g. of the above dyestuff, 100 g. urea, 200 ml. water, 500 g. alginate thickening (60 g. sodium alginate per kg. of thickening), 20 g. sodium carbonate and 10 g. ludigol and is made up with water to 1 kg., it is dried, steamed for 8 minutes at 103° C., rinsed first with cold and then with hot water and soaped at boiling temperature; a deep turquoise coloured print of good fastness to washing and light is thus obtained.

The 2-methylsulphonyl-6-amino-benzothiazole of M.P. 179° C. used in this example is prepared by oxidation of 2-methylmercapto-6-nitrobenzothiazole, known from the literature (British patent specification No. 598,985), to give 2-methylsulphonyl-6-nitrobenzothiazole and its catalytic reduction.

When using in this example instead of 24 g. of 2-methylsulphonyl-6-aminobenzothiazole 25.5 g. of 2-ethylsulphonyl-6-aminobenzothiazole and following the process described above one also obtains a valuable dyestuff which yields on cotton a strong turquoise print.

EXAMPLE 2

57.6 grams copper phthalocyanine are introduced at 20–30° C. into 320 ml. chlorosulphonic acid. The reaction mixture is stirred for 30 minutes at room temperature, then heated to 142° C. in the course of 1½ hours and kept at this temperature for 3 hours. After cooling, the reaction mixture is poured onto 2.2 kg. ice and 180 g. sodium chloride at 0–5° C. The sulphonic acid chloride is filtered off with suction and washed with 1 litre 1% hydrochloric acid at 0° C. The product is suspended in 160 ml. water and 200 g. ice, 24 g. 2-methylsulphonyl-6-aminobenzothiazole are added togethed with a wetting agent, and the suspension is buffered to pH 4 at 0–5° C. with a concentrated sodium hydroxide solution. After the addition of 5 ml. pyridine, the mixture is warmed to room temperature in the course of some hours while the eliminated hydrochloric acid is continuously neutralised to a pH of 6±0.5 first with 20 g. sodium carbonate, then with a 25% ammonia solution. After termination of the reaction, the mixture is heated at 75° C. for a short time, stirred until cold and filtered off with suction. The dyestuff is dried at 60° C. In the form of the free acid, it corresponds to the probable formula

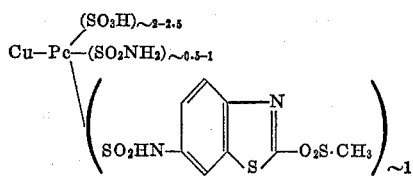

168 ml. water at 20–25° are introduced into a dye-breaker of 300 ml. capacity, which is placed into a heatable water bath. 0.3 g. of the above dyestuff are intimately mixed with 2 ml. cold water to give a paste, to which 30 ml. hot water (70° C.) are then added; the dyestuff thereby dissolves. The dyestuff solution is added to the water mentioned above and 10 g. cotton yarn are continuously moved in this dyebath. The temperature of the dyebath is raised to 70–80° C. within 10 minutes, 10 g. anhydrous sodium sulphate are added and dyeing is continued for 30 minutes. 4 grams anhydrous sodium carbonate are then added to the dyebath and dyeing is continued for 60 minutes at 70–80° C. The dyed material is then withdrawn from the dyebath, the adhering liquor removed by wringing or squeezing and the material rinsed first with cold water and then with hot water, until no more bleeding occurs in the rinsing liquor. The dyed material is then soaped at boiling temperature for 20 minutes in a bath containing 0.2 g. sodium alkyl sulphate, it is again rinsed and then dried in a drying cabinet at 60–70° C. A turquoise dyeing of excellent fastness to washing and light is obtained.

If in this example 25.5 g. of 2-ethylsulphonyl-6-aminobenzothiazole are used instead of 24 g. of 2-methylsulphonyl-6-aminobenzothiazole a valuable dyestuff is obtained which, according to the above process, yields on cotton a turquoise dyeing of excellent fastness to light and washing.

EXAMPLE 3

89.6 grams copper phthalocyanine-4,4′,4″,4‴-tetrasulfonic acid are introduced at 20–30° C. into 500 ml. chlorosulphonic acid. The reaction mixture is heated to 135° C. within 1 hour, stirred at the same temperature for 3 hours, cooled and decomposed below 5° C. in ice. After filtering off with suction, the product is washed with 1% hydrochloric acid at 0° C. and suspended in 160 ml. water and 200 g. ice. 24 grams 2-methylsulphonyl-6-amino-benzothiazole are added together with a wetting agent, and the mineral acid is buffered below 5° C. to pH 4 with a concentrated sodium hydroxide solution. After the addition of 5 ml. pyridine, the mixture is allowed to warm gradually to room temperature and kept at pH ±0.5 by the addition of a 25% ammonia solution. After termination of the reaction, the dyestuff completely dissolves, it is salted out with sodium chloride and dried at 60° C. It dyes cotton in fast turquoise shades.

EXAMPLE 4

Copper phthalocyanine-tetrasulphonic acid chloride prepared according to Example 1 is suspended in 160 ml. water and 200 g. ice. 24 grams 2-methylsulphonyl-6-aminobenzothiazole are added together with a wetting agent, the acid is buffered to pH 6 and the liberated hydrochloric acid neutralise at 20–30° C. and pH 8 with a 25% ammonia solution. When the reaction is completed, the dyestuff is salted out and dried at 60° C. It dyes cotton and regenerated cellulose in fast turquoise shades.

EXAMPLE 5

Chlorosulphonated copper phthalocyanine produced according to Example 2 is suspended in 180 ml. water and 200 g. ice. 24 grams 2-methyl-sulphonyl-6-aminobenzothiazole are added together with a wetting agent, the mineral acid is buffered to pH 4 and the temperature gradually raised to 40° C. The eliminated hydrochloric acid is continuously neutralised at pH 7±0.5 with a 10% ethylamine solution. When the condensation is completed, the dyestuff is salted out and dried. It dyes cotton and staple fibres in turquoise blue shades.

EXAMPLE 6

57.6 grams copper phthalocyanine are introduced at 20–30° C. into 250 ml. chlorosulphonic acid. The temperature is raised to 115° C. in the course of 1½ hours, the mixture is kept at the same temperature for 3 hours and then cooled to 80° C. At this temperature, 50 ml. thionyl chloride are added dropwise within 30 minutes and the reaction mixture is further stirred for 3 hours at 90° C. The mixture is cooled to room temperature and poured on to ice in such a manner that the temperature is maintained below +5° C. The phthalocyanine-trisulphonic acid chloride is filtered off with suction, washed with 1 litre 1% hydrochloric acid at 0° C. and suspended in 200 g. ice and 160 ml. ice water. 32.9 grams 2-methylsulphonyl-6-aminobenzothiazole-5- or -7-sulphonic acid are then added, the reaction mixture is adjusted to pH 4 with a concentrated sodium hydroxide solution, whereby the temperature must not exceed 5° C. After the addition of 5 ml. pyridine, the temperature of the mixture is allowed to rise to room temperature in the course of some hours and the mixture is continuously neutralised at pH 6±0.5 with a 25% ammonia solution. When the reaction is completed, the finished dyestuff is precipitated with sodium chloride, filtered off with suction and dried at 60° C. The dyestuff obtained dyes cotton and regenerated cellulose in turquoise blue shades.

EXAMPLE 7

To a suspension of the chlorosulphonated copper phthalocyanine, prepared according to Example 2, in 160 ml. water and 200 g. ice, there are added 30.5 g. 2-benzylsulphonyl-6-aminobenzothiazole together with a wetting agent. The mineral acid is buffered to pH 4 at 0° C., 5 ml. pyridine are added and the temperature is raised to 25° C. in the course of 4–5 hours, while the eliminated hydrochloric acid is continuously neutralised at pH 6±0.5 with a 25% ammonia solution. When the reaction is completed, the dyestuff is salted out and dried at 50° C.

The dyestuff obtained dyes cotton fabrics in turquoise blue shades.

In this example instead of 2-benzylsulphonyl-6-aminobenzthiazole there can also be used 2-phenylsulphonyl-6-aminobenzthiazole, 2 - (4′ - carboxyphenylsulphonyl) - 6-aminobenzthiazole or 2-(3′-carboxyphenylsulphonyl)-6-aminobenzthiazole. One likewise obtains dyestuffs with valuable dyeing properties.

EXAMPLE 8

To a suspension of the copper phthalocyanine-tetrasulphonic acid chloride, produced according to Example 1, in 160 ml. water and 200 g. ice, there are added 24 g.

2-methylsulphonyl-6-aminobenzothiazole, 15.8 g. p-sulphanilic acid and a wetting agent. The mineral acid is buffered to pH 4 at 0° C., 5 ml. pyridine are added and the mixture is allowed to warm to room temperature in the course of some hours. The pH value of 6±0.5 is maintained by the addition of sodium carbonate. When a change of the pH value can no longer be observed, the dyestuff is salted out with sodium chloride and dried at 50° C.

The green dyestuff powder obtained dyes cotton in turquoise shades.

EXAMPLE 9

A suspension of copper phthalocyanine-tetrasulphochloride in 160 ml. of water and 200 g. of ice prepared according to the method described in Example 1, is added to 25.5 g. of 2-ethylsulphonyl-6-aminobenzthiazole and 10.2 g. of 1-aminomorpholine and a wetting agent. The pH of the mixture is reduced by means of mineral acids at 0° C. to 4, and 5 ml. of pyridine added. The reaction mixture is stirred for several hours, whereupon the temperature raises to room temperature. During the stirring of the reaction mixture the pH value has kept constant at about 6 with the addition of soda. For completion of the reaction the mixture is then heated to 50° C. and the dyestuff formed salted out with rock salt and filtered with suction. The dyestuff is dried at 50° C. in the vacuum and dyes cotton turquoise shades.

EXAMPLE 10

To a suspension of copper phthalocyanine-tetrasulphonic acid chloride in 160 ml. of water, which was prepared according to the method described in Example 1 there are added 200 g. of ice and 24 g. of 2-methylsulphonyl-6-aminobenzthiazole and a wetting agent. The reaction mixture is buffered to pH 4, and 5 ml. of pyridine added at 0° C. The reaction temperature raises to room temperature whilst stirring for several hours and keeping the pH constant at 6 to 7 by means of adding a 10% aqueous solution of 2-hydroxyethylamine. When no further change of the pH is to be noted the dyestuff has completely formed and is salted out with rock salt. It can be dried at 50° C. in the vacuum and dyes cotton turquoise shades.

In the preceeding examples the fractional numbers 0.5, 1.5, 2.5 etc. mean that there is obtained a mixture of dyestuffs having on the average the given number of respective groupings; the figures 0.5 to 1.5 e.g. would thus mean that the dyestuff mixture may obtain individual dyestuffs having no grouping of the respective kind plus those having one grouping of the respective kind plus those having two groupings of the respective kind. The number of groupings to be introduced into the starting dyes somewhat depends on the reaction conditions. It is easily to be understood that the quantitive analysis of the final products can only indicate the average number of groupings as long as a quantitive separation of each individual dyestuff is not possible or not desired.

We claim:
What is claimed is:
1. Phthalocyanine reactive dyestuff of the formula

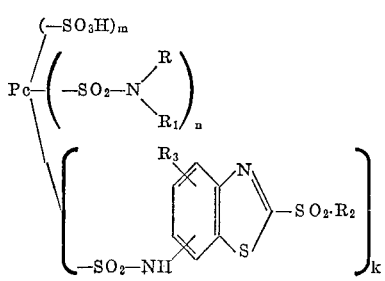

or

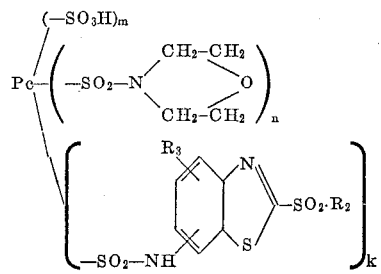

wherein Pc stands for the residue of a copper, nickel, or cobalt phthalocyanine; R and $R_1$ are selected from the group consisting of hydrogen, substituted or unsubstituted lower alkyl, cyclohexyl, phenyl, benzyl, naphthyl, or 1,2,4 triazol-3-yl; $R_2$ is selected from the group consisting of substituted or unsubstituted lower alkyl, phenyl, and benzyl; and $R_3$ is selected from the group consisting of hydrogen, sulphoxy, carboxy, halogen, nitro, hydroxy, and substituted or unsubstituted lower alkyl, lower alkoxy, lower alkyl sulphonyl, phenylazo, naphthylazo, phenyl sulphonyl, and naphthyl sulphonyl; wherein with respect to R, $R_1$, $R_2$, and $R_3$ the substituents for said substituted radicals are selected from the group consisting of hydrogen, halogen, hydroxy, nitro, cyano, amino, lower alkyl, lower alkoxy, sulphoxy, carboxy, sulphone, carbo-loweralkoxy, and disulphimido; and wherein $m$ stands for a number from 0.5 to 3, $n$ stands for a number from 0.5 to 3, and $k$ stands for a number from 1 to 3, wherein the sum total of $k$, $m$, and $n$ is from about 3 to about 4.

2. A dyestuff of claim 1 wherein $m$ stands for a number from about 1 to about 2.5, $n$ stands for a number from 0.5 to about 1 and $k$ stands for a number of about 1.

3. A dyestuff of claim 1 wherein R and $R_1$ stands for hydrogen or lower alkyl, Pc stands for copper-phthalocyanine, $R_3$ stands for hydrogen, $R_2$ stands for lower alkyl, phenyl, carboxy substituted phenyl or sulphophenyl, $m$ stands for a number from about 1 to about 2.5, $n$ stands for a number from 0.5 to about 1 and $k$ stands for a number of about 1.

4. A dyestuff corresponding to the formula

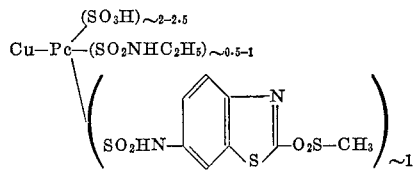

5. A dyestuff corresponding to the formula

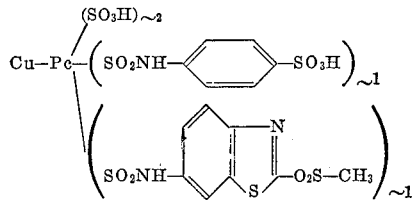

6. A dyestuff corresponding to the formula

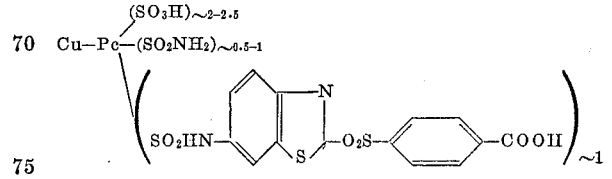

7. A dyestuff corresponding to the formula
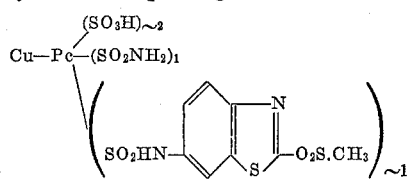
8. A dyestuff corresponding to the formula
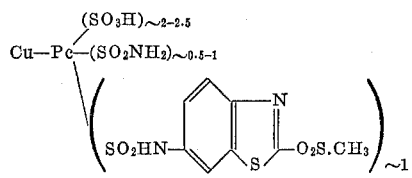
9. A dyestuff corresponding to the formula
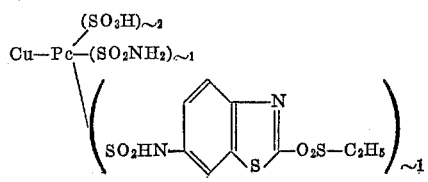
10. A dyestuff corresponding to the formula
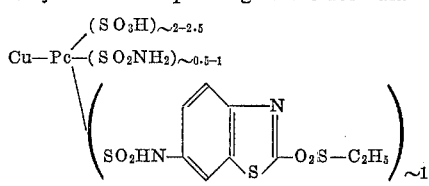
References Cited
UNITED STATES PATENTS
3,239,536   3/1966   Barben et al. _____ 260—299
ALEX MAZEL, Primary Examiner
R. J. GALLAGHER, Assistant Examiner
U.S. Cl. X.R.
8—54.2, 63; 260—239.95, 242, 304